United States Patent [19]
Yamazaki et al.

[11] Patent Number: 5,870,075
[45] Date of Patent: Feb. 9, 1999

[54] LCD DISPLAY WITH DIVIDED PIXEL ELECTRODES CONNECTED SEPARATELY WITH RESPECTIVE TRANSISTORS IN ONE PIXEL AND METHOD OF DRIVING WHICH USES DETECTION OF MOVEMENT IN VIDEO

[75] Inventors: Shunpei Yamazaki, Tokyo; Jun Koyama, Kanagawa; Toshimitsu Konuma, Kanagawa; Misako Nakazawa, Kanagawa; Takeshi Nishi, Kanagawa, all of Japan

[73] Assignee: Semiconductor Energy Laboratory Co., Ltd., Kanagawa-ken, Japan

[21] Appl. No.: 553,726

[22] Filed: Oct. 23, 1995

[30] Foreign Application Priority Data

Oct. 24, 1994 [JP] Japan .................................. 6-284475
Nov. 15, 1994 [JP] Japan .................................. 6-305566

[51] Int. Cl.$^6$ ............................ G09G 5/10; G09G 3/36; G02F 1/1343
[52] U.S. Cl. ............................ 345/149; 345/92; 349/144
[58] Field of Search ................................ 345/43, 89, 92, 345/98, 100, 103, 149, 88, 152, 204, 214, 99, 93; 349/42, 84, 85, 143, 144, 146

[56] References Cited

U.S. PATENT DOCUMENTS

| | | | |
|---|---|---|---|
| 4,775,861 | 10/1988 | Saito | 345/92 |
| 4,840,460 | 6/1989 | Bernot et al. | 349/144 |
| 4,995,703 | 2/1991 | Noguchi | 349/144 |
| 5,124,695 | 6/1992 | Green | 345/149 |
| 5,126,865 | 6/1992 | Sarma | 349/144 |
| 5,132,820 | 7/1992 | Someya et al. | |
| 5,162,931 | 11/1992 | Holmberg. | |
| 5,164,851 | 11/1992 | Kanemori et al. | 349/144 |
| 5,204,659 | 4/1993 | Sarma | 345/92 |
| 5,341,153 | 8/1994 | Benzschawel et al. | 345/152 |
| 5,392,143 | 2/1995 | Akiyama et al. | 345/93 |
| 5,404,236 | 4/1995 | Hartmann et al. | 345/89 |
| 5,654,732 | 8/1997 | Katakura | 345/103 |

*Primary Examiner*—Jeffery Brier
*Assistant Examiner*—Paul A. Bell
*Attorney, Agent, or Firm*—Sixbey, Friedman, Leedom & Ferguson, PC; Gerald J. Ferguson, Jr.; Eric J. Robinson

[57] ABSTRACT

In an active matrix type liquid crystal display device, signal lines and scanning lines are crossed in a matrix form on a transparent substrate. A thin film transistor and a transparent pixel electrode are disposed at each intersecting portion. A liquid crystal is interposed between the transparent substrate and another transparent substrate. A central pixel electrode and a peripheral pixel electrode surrounding the central pixel electrode is arranged in each pixel region. When the pixel region has movement in a dynamic image display, after an electric field is applied to the liquid crystal by the peripheral pixel electrode, an electric field is applied to the liquid crystal by the central pixel electrode with a desired delay time.

19 Claims, 15 Drawing Sheets

5,870,075

LCD DISPLAY WITH DIVIDED PIXEL ELECTRODES CONNECTED SEPARATELY WITH RESPECTIVE TRANSISTORS IN ONE PIXEL AND METHOD OF DRIVING WHICH USES DETECTION OF MOVEMENT IN VIDEO

BACKGROUND OF THE INVENTION

1. Field of the Invention

The present invention relates to an active matrix liquid crystal display device, more specifically, to an active matrix liquid crystal device having improved operation speed, and a method for driving the same.

2. Description of the Related Art

Conventionally, the CRT (cathode ray tube) display is a most commonly used display device. Since the CRT display uses a vacuum glass tube and accelerates electrons by a high voltage, it has such problems as a large capacity, heavy weight, and a large power consumption. Thus, flat panel display devices using plasma or a liquid crystal are now under development.

The liquid crystal display device performs on/off display, i.e., light and shade display by controlling the polarization of light, a transmission light quantity, or a scattering light quantity utilizing the fact that a liquid crystal material has different dielectric constants in directions parallel with and perpendicular to the molecular axis. Commonly used liquid crystal materials is TN (twisted nematic) liquid crystal, STN (super twisted nematic) liquid crystal, ferroelectric liquid crystal and the like.

Particularly in recent years, among various types of liquid crystal display devices, the active matrix liquid crystal display device has come to be used widely.

FIG. 10 shows a conventional active matrix liquid crystal display device. In this active matrix liquid crystal display device, signal lines 1001–1003 and scanning lines 1004–1006 are provided in a matrix form and thin film transistors (TFTs) 1007–1010 are arranged at intersection of those lines. Source electrodes of the TFTs 1007–1010 are connected to the signal lines 1001–1003 and gate electrodes of the TFTs 1007–1010 are connected to the scanning lines 1004–1006. Drain electrodes of the TFTs 1007–1010 are connected to retaining capacitors 1016–1019 and pixel electrodes (not shown) provided for respective liquid crystal cells 1012–1015 of pixel regions.

There are two methods of forming peripheral driver circuits for the pixels. In a first method, the peripheral driver circuits are formed using single crystalline silicon transistor integrated circuits. In a second method, they are formed by polysilicon TFTs and provided together with an active matrix on the same glass substrate. In the first method, the driver circuits are connected to the active matrix by TAB (tape automated bonding) or COG (chip on glass). In the second method, the driver circuits are connected to the active matrix via metal wirings on the substrate, rather than TAB or COG.

FIG. 11 shows a conventional matrix panel having peripheral circuits and a pixel matrix. Pixels of a pixel matrix 1101 are connected to a signal line driving circuit 1104 and a scanning line driving circuit 1105 via signal lines 1102 and scanning lines 1103, respectively.

FIGS. 12A–12C show waveforms of voltages applied to the electrodes of a TFT. In FIG. 12A, an electric signal $V_s$ is applied to the source electrode of the TFT via the signal line. In FIG. 12B, an electric signal $V_G$ is applied to the gate electrode. As a result, a voltage $V_D$ in FIG. 12C produces at the drain electrode.

In an N-channel type TFT, when a high (positive) voltage is applied to the gate electrode, the TFT turns on and the source and drain voltages are made equal to each other. As a result, the voltage on the signal line is stored in a retaining capacitor. Then when a low (negative) voltage is applied to the gate electrode, the TFT turns off and the source and drain electrodes are insulated from each other to obtain an open state. As a result, the voltage of the retaining capacitor is stored until the TFT turns on next time, which causes new writing.

A difference between voltages of the opposed electrode and the pixel electrode is applied to each of the liquid crystal cells 1012–1015 (see FIG. 10) interposed between those electrodes. The light polarizing characteristic of the liquid crystal cell is changed in accordance with the difference voltage. By passing through a polarizing plate, a variation of transmittance is ultimately obtained, thereby providing light and shade display.

The conventional active matrix liquid crystal display device mainly uses the TN liquid crystal because of its low price and ease of orientation control. With passing through a polarizing plate, the TN liquid crystal has a transmittance-applied voltage (V) characteristic of FIG. 13. By virtue of a relatively gentle slope, this transmittance-applied voltage characteristic curve enables gradational display with control by the applied voltage. However, the TN liquid crystal is associated with slow response with respect to the applied voltage. In general, in the TN liquid crystal, there occurs a response delay of 10 ms to several 10 ms when the gradation level is changed from black to white, or vice versa (see FIG. 14).

In one display pixel, a gradation level is changed from black to white, it is observed that the gradation level of a central portion of the display pixel is first changed and the gradation level of its peripheral portion is changed with a delay. This results from a phenomenon that the central portion and the peripheral portion of a liquid crystal in a pixel region have a difference in a response time when an electric field is applied.

To explain this phenomenon, FIGS. 15A and 15B show states of liquid crystal molecules 1509 and electric lines of force 1510 in the conventional active matrix liquid crystal display device when a voltage is applied to the liquid crystal. In FIG. 15A, a liquid crystal cell has a pair of glass substrates 1501 and 1502 and a pair of transparent electrodes 1507 and 1508, and liquid crystal molecules are aligned by applying an electric field between the transparent electrodes 1507 and 1508. In FIG. 15B, electric lines of force between the transparent electrodes 1507 and 1508 in a case of FIG. 15A is shown. By interposing the configuration of FIG. 15A between a pair of polarizing plates, a simplest form of liquid crystal display device can be obtained. An orientation (alignment) film and switching TFTs, which actually exist in addition to the components shown, are omitted from FIGS. 15A and 15B.

When an electric field is applied by the pixel electrodes 1507 and 1508, the liquid crystal molecules 1509 change their orientations so that they become parallel with the electric field uniformly. Thus, a polarization state of light passing through the liquid crystal is changed. In this state, in a peripheral portion of the pixel, the liquid crystal molecules 1509 on the pixel side of a boundary surface 1500 operate to change their orientations while those on the opposite side of the surface 1500 tend to keep their orientations. Thus, a liquid crystal in a pixel side region close to the boundary surface 1500 has slow response speed than that in a central region of the pixel.

Although the conventional active matrix liquid crystal display device can display a still (static) image with image quality equivalent to or better than that of the CRT display, it cannot display a moving (dynamic) image with image quality equivalent to that of the CRT display due to the above response delay of the liquid crystal. This problem is actually observed as an unnatural display at the occurrence of a fast hue variation and slow movement in displaying a moving picture.

SUMMARY OF THE INVENTION

To solve the above problems, in the present invention, a pixel electrode is divided into a central pixel electrode and a peripheral pixel electrode. When images includes movement, a peripheral pixel electrode in a corresponding pixel portion is driven in advance, in order to accelerate response of a liquid crystal material to an applied voltage when the central pixel electrode is driven. That is, a liquid crystal in a region adjacent to the peripheral pixel region which needs longer time to respond is caused to respond in advance, and then a liquid crystal in the central pixel region is caused to respond. Thus, it appears that the entire liquid crystal in a pixel (electrode) responds at high speed almost at the same time. A moving portion is detected by delaying a video signal with a frame memory and comparing with video signal data before and after the delaying each other. This allows correct display of a moving image (dynamic image).

According to the invention, there is provided an active matrix liquid crystal display device in which signal lines and scanning lines are crossed in a matrix form on a transparent substrate, a TFT and a transparent pixel electrode are disposed at each intersecting portion, a liquid crystal material is interposed between the transparent substrate and another transparent substrate, and display is effected by applying a voltage to the liquid crystal material, wherein the transparent pixel electrode includes a first pixel electrode located approximately at the center of a pixel region enclosed by the scanning lines and signal lines and a second pixel electrode so shaped as to surround at least two sides of the first pixel electrode, the first and second pixel electrodes are respectively connected to first and second TFTs that are different from each other, and the first and second TFTs are connected to different signal lines and different scanning lines.

FIG. 1 shows the above configuration, that is, signal lines 107 and 108, scanning lines 105 and 106, TFTs 103 and 104 connected to those signal lines and scanning lines, and a central pixel electrode 101 and a peripheral pixel electrode 102 that are transparent electrodes and connected to the TFTs 103 and 104. In FIG. 1, the pixel electrode region is constructed by the central pixel electrode 101 and the peripheral pixel electrode 102, which correspond to the first and second pixel electrodes, respectively.

In displaying a moving (dynamic) image, the TFT 104 is turned on to apply a voltage only to the peripheral pixel electrode 102. With a desired delay, the TFT 103 is turned on to apply a voltage to the central pixel electrode 101.

Since the peripheral pixel electrode 102 surrounds about ¾ of the perimeter of the central pixel electrode 101, about ¾ of a liquid crystal adjacent to the periphery of the pixel region responds and then a liquid crystal in a central portion of the pixel region responds with a delay.

Influenced by the liquid crystal in the periphery of the pixel region, the liquid crystal adjacent to the periphery of the pixel region makes slow operation. By the above operation and properly adjusting the operation timing, the liquid crystal in the entire pixel region is allowed to complete its response at the same time. Not influenced by the liquid crystal in the peripheral pixel portion, the liquid crystal in the central pixel electrode 101 can respond at high speed. Thus, it becomes possible to display a moving image correctly.

To enable this operation, it is necessary to drive the first and second TFTs 103 and 104 at different timings with different driving circuits via different signal lines and scanning lines. An example of specific timings is such that a video signal for driving the first TFT 103 is delayed from that for driving the second TFT 104 by at least one frame period that is an integer multiple of the one frame period.

In FIG. 1, the peripheral pixel electrode 102 is needed to surround at least ½ of an edge portion of the central pixel electrode 101. This is because if the ratio of the liquid crystal under the central pixel electrode 101 and adjacent to a liquid crystal outside the pixel region to the entire peripheral region exceeds 50% (the ratio is about 25% in FIG. 1), the response delay due to the liquid crystal in the periphery of the pixel region becomes more remarkable than the effect of accelerating the response due to the peripheral pixel electrode 102. The electrode 101 is arranged apart from the electrode 102. The gap between these electrodes 101 and 102 is an important factor.

In FIG. 15B, electric lines of force extend outside of the boundary of a pixel when a voltage is applied between a pair of pixel electrodes. Thus, liquid crystal molecules that are not interposed between the pixel electrodes is caused to respond. FIG. 3 shows a measurement result of a relationship between the applied voltage and the protrusion length (blurred length) of liquid crystal molecules from the electrodes. When the applied voltage is 5 V, the protrusion length is about 4 μm. This represents that by applying 5 V, the orientations of liquid crystal molecules that are as distant as about 4 μm from the pixel electrodes is changed. When the applied voltage is 5 V in a case wherein the central pixel electrode 101 does not overlap the peripheral pixel electrode 102 (see FIG. 1), the gap between the electrodes 101 and 102 may be set at about 4 μm or less.

According to the present invention, there is provided a liquid crystal display device including, a one unit region for applying an electric field to a liquid crystal, and a plurality of electrodes arranged in the one unit region and including an electrode that occupies at least ½ of a region adjacent to a periphery of the one unit region and an electrode that occupies a central portion of the one unit region. The one unit region (i.e., a minimum unit of display) is defined as a pixel region by a central pixel electrode 101 and a peripheral pixel electrode 102.

It is necessary that at least ½ of a region surrounding the central pixel electrode 101 occupying a central portion of the one unit region be occupied by the peripheral pixel electrode 102. That is, the electrode 102 should occupy at least ½ of the region adjacent to the periphery of the one unit region. In FIG. 1, about ¾ of the region surrounding the electrode 101, i.e., about ¾ of the region adjacent to the periphery of the pixel region is occupied by the electrode 102.

According to the invention, there is provided a liquid crystal display device including, a one unit region for applying an electric field to a liquid crystal, and a plurality of electrodes arranged in the one unit region and including a first electrode that occupies a central portion of the one unit region and a second electrode disposed to surround at least ½ of a perimeter of the first electrode.

According to the invention, there is provided a liquid crystal display device including, a one unit region for a liquid crystal display, first means for applying an electric field to a region that occupies at least ½ of a region adjacent to a periphery of the one unit region, and second means for applying an electric field to a central portion of the one unit region after the electric field is applied from the first means to the liquid crystal.

An example of the above device is shown in FIG. 1. In FIG. 1, the one unit region has the central pixel electrode 101 and the peripheral pixel region 102 and corresponds to a pixel region. The electrode 101 is the electrode occupying the central portion of the one unit region and the electrode 102 is the electrode for applying an electric field to a region that occupies about ¾ of the region adjacent to the periphery of the one unit region.

An electric field is applied from the peripheral pixel electrode 102 to the liquid crystal. Then, with a desired delay, an electric field is applied from the central pixel electrode 101 to the liquid crystal. In this matter, the configuration can be realized in which electric fields are sequentially applied, at desired timings, to the region adjacent to the periphery of the pixel region and then to the central portion of the pixel region. Also, the slow response region adjacent to the periphery of the pixel region is allowed to respond first. Thus, the entire pixel is allowed to respond uniformly at high speed.

According to the invention, there is provided a display device including means for applying an electric field to a part of a region of a liquid crystal, wherein the applying means first applies an electric field to at least ½ of a region adjacent to a periphery of the part of the region, and then applies an electric field to the remaining region.

According to the invention, there is provided a display device including means for applying an electric field to a desired region of a liquid crystal, wherein the applying means sequentially applies electric fields from at least part of a region adjacent to a periphery of the desired region to a central portion and/or a peripheral portion of the central portion of the desired region.

According to the invention, there is provided a display device including means for applying an electric field to a desired region of a liquid crystal, wherein the applying means applies an electric field to a central portion and/or a peripheral portion of the desired region after applying an electric field to at least part of a region adjacent to a periphery of the desired region.

FIG. 1 shows the above device having the peripheral pixel electrode 102 for applying an electric field to the region adjacent to the periphery of the desired region (the pixel region), and the central pixel electrode 101 for applying an electric field to the central portion of the desired region. The electric field is applied by the electrode 101 after the electric field is applied by the electrode 102. The liquid crystals are allowed to sequentially respond from the liquid crystal located in the peripheral portion of the desired region (the pixel region) to that located in the central portion of the desired region. Thus, the response delay due to the liquid crystal in the periphery of the pixel region can be corrected.

Also, in the invention, a peripheral pixel electrode is formed in a plane (surface) different than a central pixel electrode, so that an electric field can be applied more easily to a peripheral portion of the central pixel region.

According to the invention, there is provided an active matrix liquid crystal display device in which signal lines and scanning lines are crossed in a matrix form on a transparent substrate, a TFT and a transparent pixel electrode are disposed at each intersecting portion, a liquid crystal material is interposed between the transparent substrate and another transparent substrate, and display is effected by applying a voltage to the liquid crystal material, wherein the transparent pixel electrode includes a first pixel electrode located approximately at the center of a pixel region enclosed by the scanning lines and signal lines and a second pixel electrode so shaped as to surround the first pixel electrode, the first and second pixel electrodes are respectively connected to first and second TFTs that are different from each other, the first and second TFTs are connected to different signal lines and different scanning lines, and the first and second pixel electrodes are formed in different planes (surfaces).

According to the invention, there is provided a driving method of an active matrix liquid crystal display device which has transparent pixel electrodes arranged on a transparent substrate in a matrix form, wherein each of the transparent pixel electrodes includes a first pixel electrode located approximately at the center of a pixel region enclosed by the scanning lines and signal lines and a second pixel electrode so shaped as to surround the first pixel electrode, She first and second pixel electrodes are respectively connected to first and second TFTs that are different from each other, the first and second TFTs are connected to different signal lines and different scanning lines, and the first and second pixel electrodes are formed in different planes (surfaces), the driving method including the steps of, delaying an input video signal with a frame memory, comparing the delayed video signal with the original video signal, detecting a moving portion from a comparison result, and driving the second TFT using a video signal that is one frame ahead of a video signal used for driving the first TFT when the moving portion is detected.

FIGS. 6A and 6B show the above constitution, i.e., a pixel configuration of an active matrix liquid crystal display device. FIG. 6A is a top view of a pixel, and FIG. 6B is a sectional view taken along line a–a' in FIG. 6A.

In FIG. 6A, a central pixel electrode 601 corresponding to the conventional pixel is formed on a transparent substrate 610. A peripheral pixel electrode 602 as the second pixel electrode is formed adjacent to the perimeter of the central pixel electrode 601 so as to surround it. Pixel TFTs 603 and 604 are connected to the electrodes 601 and 602, respectively. Scanning lines 605 and 606 and signal lines 607 and 608 are independently connected to the TFTs 603 and 604. Driving circuits (not shown) are independently connected to the scanning lines 605 and 606 and the signal lines 607 and 608. Therefore, the central pixel electrode 601 and the peripheral pixel electrode 602 can be driven at different timings by the different driving circuits.

In FIG. 6B, the peripheral pixel electrode 602 is formed in the layer located under the central pixel electrode 601. An insulating film layer 609 made of SiN, $Al_2O_3$, or the like is formed between the layer where the electrode 601 is formed and the layer where the electrode 602 is formed.

By forming the peripheral pixel electrode 602 in the layer different from the central pixel electrode 601, wiring lines connected to the respective electrodes can be formed in the layers electrically insulated from each other. Since a wiring pattern connected to the central pixel electrode 601 can be formed on the insulating film 609, it can traverse the peripheral pixel electrode 602. Thus, the peripheral pixel electrode 602 can be formed to completely surround the perimeter of the central pixel electrode 601.

Further, in FIG. 6B, the electrodes 601 and 602 are overlapped with each other at the periphery of the central pixel electrode 601. Thus, a voltage can be applied to the peripheral portion of the central pixel electrode 601 by the peripheral pixel electrode 602. Also, since the electrodes 601 and 602 are overlapped with each other, a deviation in alignment occurring in a manufacturing process can be compensated. This can improve a process margin.

An operation is as follows. A voltage applied to the peripheral pixel electrode 602 before a voltage is applied to the central pixel electrode 601. At this time, not only liquid crystal molecules in the peripheral pixel electrode 602 are oriented so that their major axes become parallel with electric lines of force, but also liquid crystal molecules in the peripheral portion of the central pixel electrode 601 change their orientations from the initial state so that their major axes become parallel with the electric lines of force. This assumes a first response.

Then, a voltage is applied to the central pixel electrode 601 with a desired delay. As a result, liquid crystal molecules in the central pixel electrode 601 are oriented so that their major axes become parallel with electric lines of force. This assumes a second response.

In this state, the liquid crystal molecules in the peripheral portion of the central pixel electrode 601 has already responded to the voltage applied from the peripheral pixel electrode 602. Thus, when the voltage is applied to the central pixel electrode 601, uniform response can be obtained in the entire portion of the central pixel electrode 601 without producing slow response of the liquid crystal in the peripheral portion thereof.

Time $T_1$ required for the first response and time $T_2$ required for the second response have a relationship $T_1 > T_2$. This results from a phenomenon that in the first response, liquid crystal molecules in the peripheral pixel electrode 602 are influenced by surrounding liquid crystal molecules and they exhibit slow response.

Now let $\Delta T$ be defined such that $\Delta T = T_1 - T_2$. In the invention, a period from the voltage application to the peripheral pixel electrode 602 to the voltage application to the central pixel electrode 601 is set equal to $\Delta T$. This realizes a state that the liquid crystal in the central portion of the central pixel electrode 601 and the liquid crystal in the peripheral portion of the central pixel electrode 601 respond at the same time. This operation state is very useful to make a hue variation and movement natural in displaying a moving image. The peripheral pixel electrode 602 may be made of chromium, to also serves as a black matrix. This provide an advantage that the orientation distortion of liquid crystal molecules in the peripheral portion of a pixel can be shielded.

According to the invention, there is provided a liquid crystal display device including a pixel region where a plurality of pixel electrodes are arranged, the pixel region having a first pixel electrode occupying a central portion of the pixel region and a second pixel electrode formed to surround the entire perimeter of the first pixel electrode.

In this configuration, the pixel region represents, for instance, a region where each of units of display is arranged in a matrix form. In FIGS. 6A and 6B, the region defined by the electrodes 601 and 602 is the pixel region.

According to the invention, there is provided a liquid crystal display device including a pixel region where a plurality of pixel electrodes are arranged, the pixel region having a first pixel electrode occupying a central region of the pixel region and a second pixel electrode disposed to surround at least part of a perimeter of the first pixel electrode, the first and second pixel electrodes being formed in different planes (surfaces).

The first and second pixel electrodes are formed in different planes. In particular, the peripheral portion of the first pixel electrode overlaps a part of the second pixel electrode. The construction of FIG. 6B can be used. The peripheral pixel electrode 602 is disposed in the layer under the central pixel electrode 601. The insulating film layer 609 is formed between the layer that the electrode 601 is formed and the layer that the electrode 602 is formed.

In the invention, it is preferred that peripheral driving circuits for driving the pixels be constituted of polysilicon TFTs. This provide the following advantages. (1) The pixel pitch of an active matrix can be reduced.

In forming an active matrix using a TAB, the pitch of the active matrix cannot be made smaller than a value determined by a minimum TAB pitch, which should allow the TAB to be bonded to a glass substrate. When the driving circuits are incorporated, the matrix pitch can be made small because of no bonding to the active matrix. (2) The reliability of wiring connections can be improved.

In using a TAB, several thousand wiring lines are output from an active matrix to an external. Thus, the possibility of connection failure at the connection points between the TAB and an active matrix substrate is high. In contrast, when the driving circuits are incorporated in the substrate, since the number of output terminals of the active matrix substrate is about 1/100 of that in the case of using the TAB, an improvement in the reliability is expected.

(3) The size of a display device can be reduced.

In using a TAB in a display device, such as a view finder, having a small screen, the TAB in the driving circuits becomes larger than an active matrix. This is a hindrance to capacity reduction of a video camera or the like. When the driving circuits are incorporated, the circuit width can be made 5 mm or less. This produces size reduction of display devices such as a view finder.

BRIEF DESCRIPTION OF THE DRAWINGS

FIGS. 2A and 2B are sectional views of pixel electrodes, in which FIG. 2A shows a response of liquid crystal molecules and FIG. 2B shows electric lines of force;

FIGS. 7A and 7B are sectional views of a pixel region, in which FIG. 7A shows electric lines of force and FIG. 7B shows a response of liquid crystal molecules;

DETAILED DESCRIPTION OF THE PREFERRED EMBODIMENTS

Embodiment 1

Figure 1:
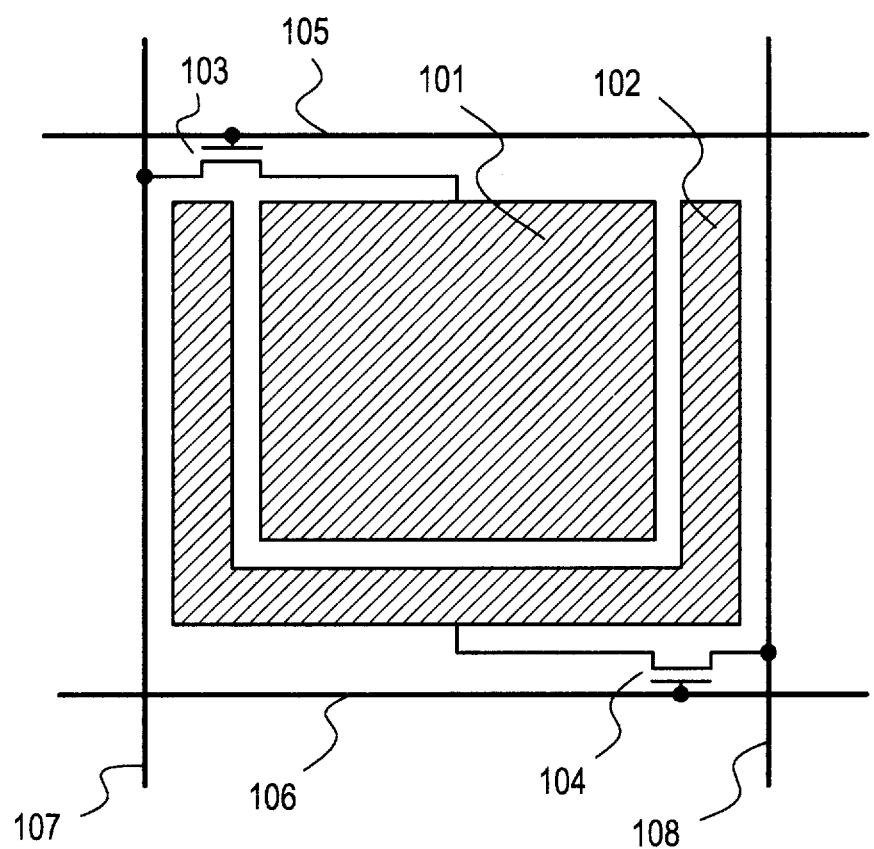
FIG. 1 is a top view of a pixel region according to a first embodiment.

FIG. 1 shows a pixel of an active matrix display device of the embodiment. In FIG. 1, one pixel is divided into two portions by a central pixel electrode 101 and a peripheral pixel electrode 102 in contrast to the fact that one pixel is conventionally formed by a single portion. The electrode 101 is the conventional pixel electrode. The electrode 102 is formed adjacent to the perimeter of the electrode 101 to surround it. Pixel thin film transistors (TFTs) 103 and 104 are connected to the electrodes 101 and 102, respectively. Scanning lines 105 and 106 are independently connected to the gate electrodes of the TFTs 103 and 104, and signal lines 107 and 108 are independently connected to the source electrodes of those TFTs. Independent driving circuits (not shown) are connected to the scanning lines 105 and 106 and the signal lines 107 and 108.

Figure 2A:
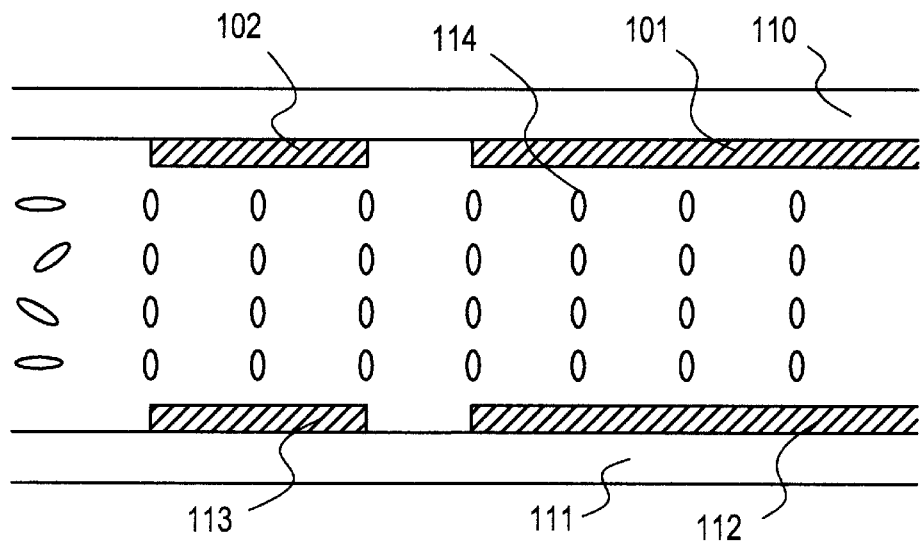
Figure 2B:
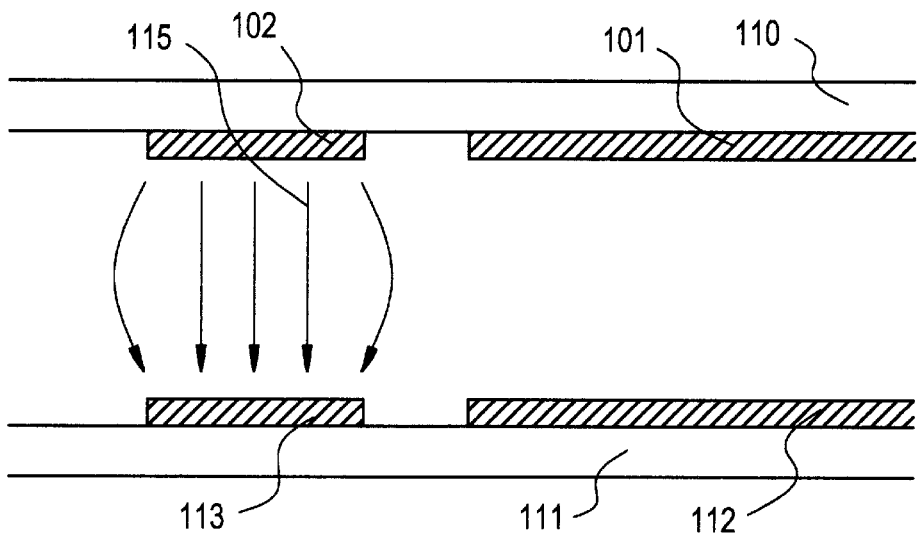

FIGS. 2A and 2B are sectional views of a pixel region. The central pixel electrode 101 and the peripheral pixel electrode 102 are formed on a transparent substrate 110. A central pixel electrode 112 opposite to the electrode 101 and a peripheral pixel electrode 113 opposite to the peripheral pixel electrode 102 are formed on a transparent substrate 111. A liquid crystal (molecule) 114 is sealed between the transparent substrates 110 and 111.

In displaying an image, there occurs no problem even in the conventional system if pixels are to display a still image, as described with the conventional device. In this case, an image is displayed by the central pixel electrode 101 having the same operation as the conventional pixel.

In displaying a moving image, this embodiment is intended to increase the display speed by driving the two type of pixel electrodes at different timings.

To improve the operation speed of a liquid crystal on the boundary of the central pixel electrode 101 which is in contact with a peripheral liquid crystal, the peripheral pixel electrode 102 is provided, and an electric field is applied to the liquid crystal by the electrode 102 before an electric field is applied to the liquid crystal by the electrode 101. This is to prevent the central liquid crystal from being influenced by the peripheral liquid crystal when an electric field is applied from the electrode 101.

In displaying a moving image, first a voltage is applied to only the peripheral pixel electrodes 102 and 113. FIG. 2B shows electric lines of force 115 in a state that an electric field is applied only by the electrodes 102 and 113. In FIG. 2B, since electric lines of force 115 also act on the outside of the peripheral pixel electrodes, not only liquid crystal molecules 114 located between the electrodes 102 and 113 but also liquid crystal molecules 114 located adjacent to the peripheral portion of the central pixel electrodes 101 and 112 are caused to respond and change their orientations.

After that, an electric field is applied to the liquid crystal molecules 114 located between the central pixel electrodes 101 and 112. FIG. 2A shows the liquid crystal molecules 114 in this state. Since the liquid crystal molecules 114 adjacent to the peripheral portion of the central pixel electrodes 101 and 112 have already responded, the liquid crystal molecules 114 located between the electrodes 101 and 112 can smoothly respond without being affected by liquid crystal molecules 114 in the region where none of the electrodes 101, 102, 112 and 113 exist.

In this embodiment, although the central pixel electrodes 101 and 112 and the peripheral pixel electrodes 102 and 113 are spaced from each other, the gap between those electrodes are important.

Figure 3:
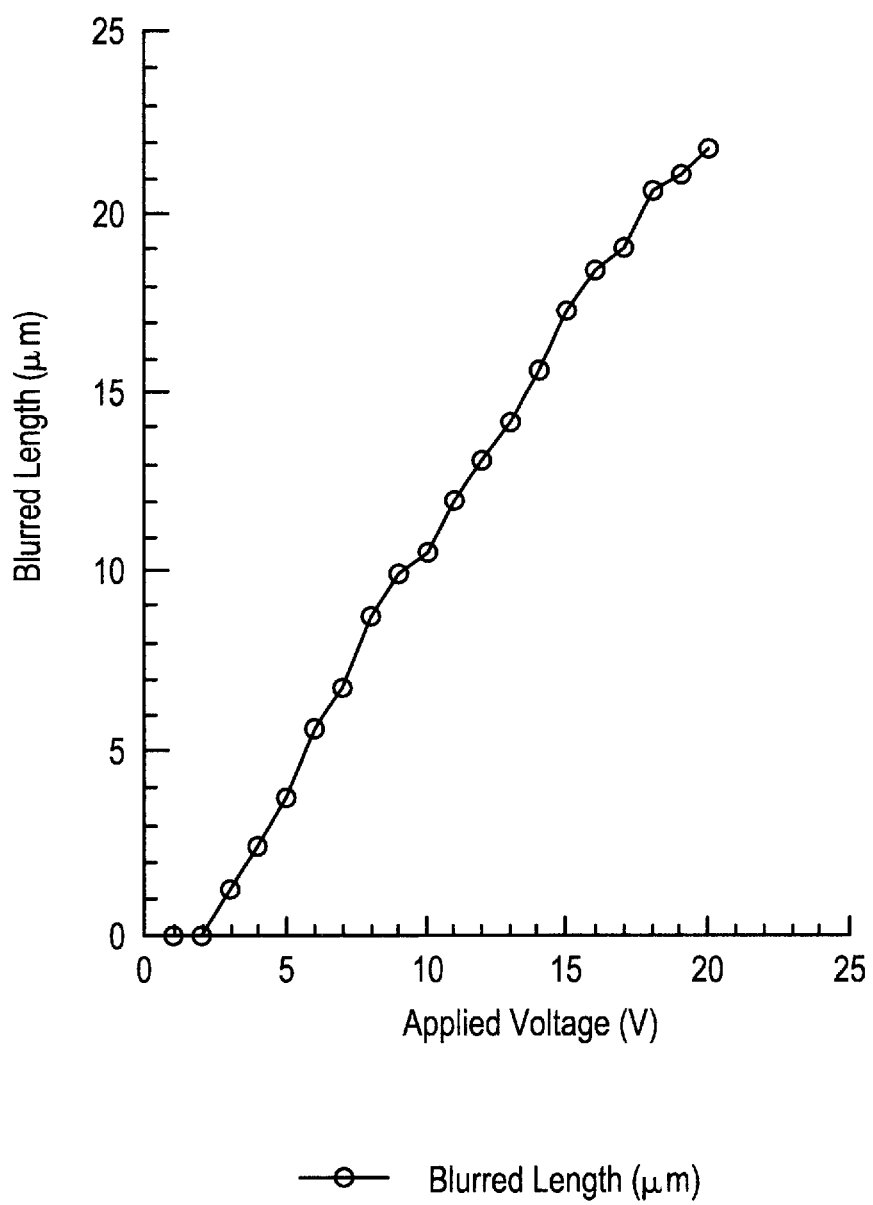
FIG. 3 shows a relationship between the applied voltage and the protrusion length from electrodes of liquid crystal molecules that respond to the applied voltage.

In FIG. 2B, when an electric field is applied between a pair of pixel electrodes 102 and 113, part of the electric lines of force 115 extends outside the boundary of the pixel electrodes 102 and 113, so that the liquid crystal molecules 14 extends outside the boundary of the pixel electrodes 102 and 115. FIG. 3 shows a measurement result of a relationship between the applied voltage and the protrusion length (blurred length) of liquid crystal molecules from the electrodes. When the applied voltage is 5 V, the protrusion length is about 4 μm. This represents that by applying 5 V, the orientations of liquid crystal molecules that are as distant as about 4 μm from the pixel electrodes can be changed. When the applied voltage is 5 V in FIG. 1, the gap between the central pixel electrode 101 and the peripheral pixel electrode 102 may be set at about 4 μm or less. In the resolution of the current photolithography for the liquid crystal display device, the gap of 4 μm can be obtained.

Embodiment 2

Figure 4A:
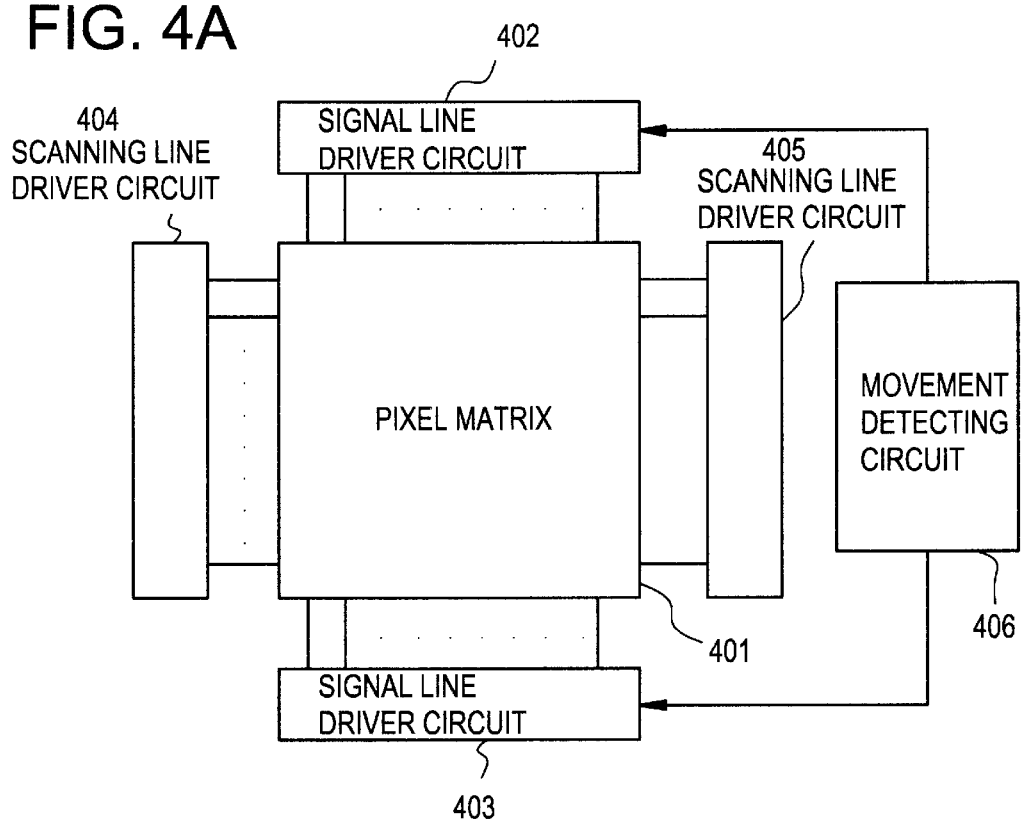
FIGS. 4A and 4B show active matrix liquid crystal display devices according to a second embodiment.
Figure 4B:
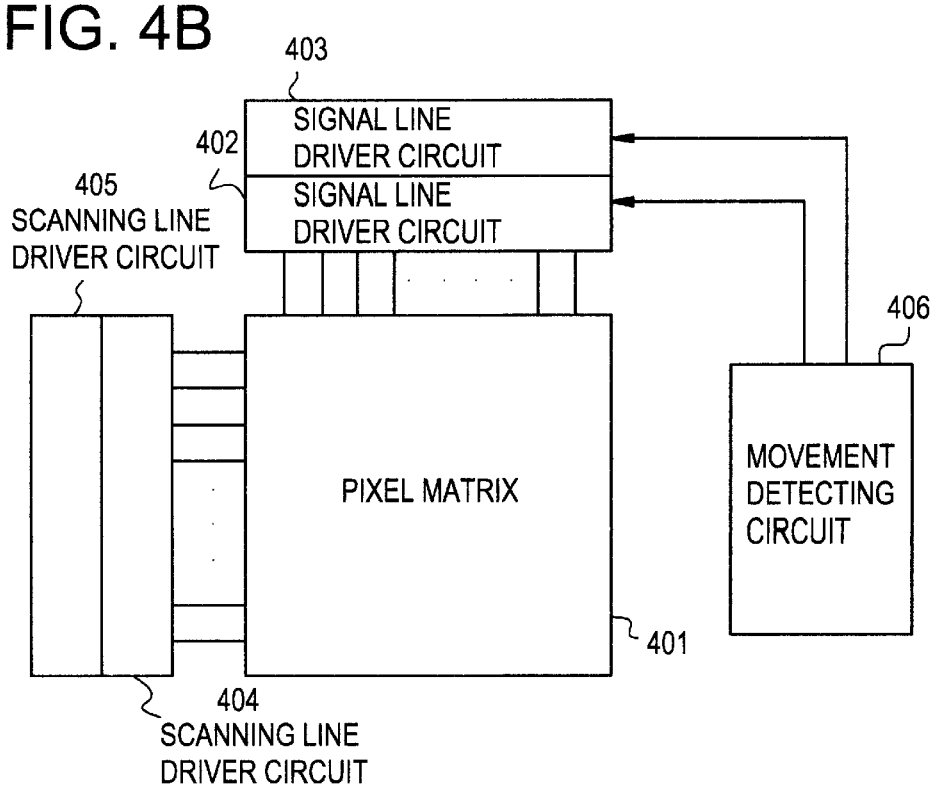

This embodiment relates to a driving method of a pixel matrix in which the unit of display has two types of pixel electrodes. FIGS. 4A and 4B show peripheral circuits and a pixel matrix in this embodiment. The pixel is the same structure as in the first embodiment. Thus, to operate the central pixels and the peripheral pixels independently, driving circuits therefor need to be provided independently. In general, driver circuits has a signal line driving circuit and a scanning line driving circuit. The signal line driving circuit and the scanning line driving circuit together drive one TFT in each pixel region.

Since two TFTs that operate differently are provided for the central pixel region and the peripheral pixel region, respectively, at least two sets of signal line driving circuits and scanning line driving circuits are needed.

In the pixel matrix 401 of FIG. 4A, pixels each having the central pixel electrode and the peripheral pixel electrode of FIG. 1 and FIGS. 2A and 2B are arranged in a matrix form. To control the TFTs connected to the central pixel electrodes, a signal line driving circuit 402 and a scanning line driving circuit 404 are connected to the pixel matrix 401 through signal lines and scanning lines, respectively. Also, to control the TFTs connected to the peripheral pixel electrodes, a signal line driving circuit 403 and a scanning lines driving circuit 405 are connected to the pixel matrix 401 through signal lines and scanning lines, respectively. The driving circuits 402–405 are arranged to surround the four sides of the pixel matrix. A movement detecting circuit 406 is connected to the signal line driving circuits 402 and 403.

FIG. 4B shows a modified version of the arrangement of FIG. 4A. That is, the signal line driving circuits 402 and 403 are provided on the same side and the scanning line driving circuits 404 and 405 are also provided on the same side, and the driving circuits 402–405 are arranged adjacent to the two sides of the pixel matrix 401.

Figure 5:
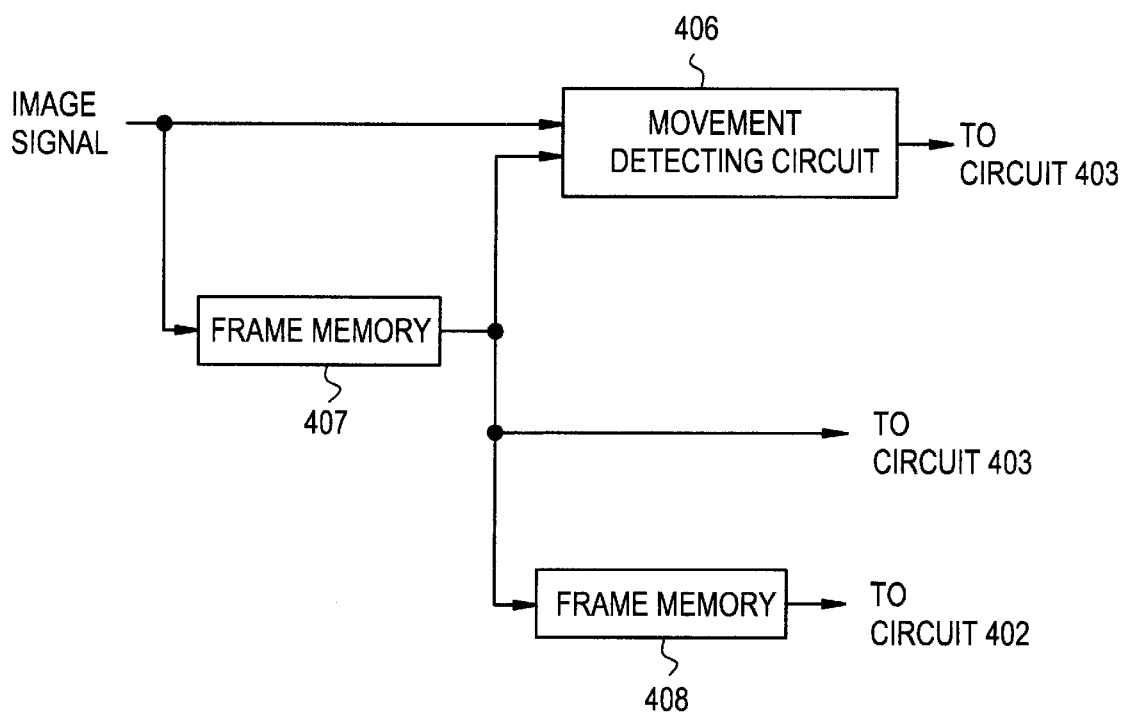
FIG. 5 shows a movement detecting system.

FIG. 5 shows a system for supplying display signals to the signal line driving circuits 402 and 403. An input video signal is a digital signal, and a processed signal is output also as a digital signal.

An image signal is input to a frame memory 407 and a movement detecting circuit 406. The output of the frame memory 407 is connected to the movement detecting circuit 406, the signal line driving circuit 403, and a frame memory 408. The output of frame memory 408 is connected to the signal line driving circuit 402.

The operation of the system is described below. An image signal is input to the frame memory 407, so that one frame image data is stored therein. The image data in the frame memory 407 is the) input to the frame memory 408 and stored therein. At this time, new image data is stored in the frame memory 407. Thus, the image data in the frame memory 407 is one frame ahead of that stored in the frame memory 408.

A movement in image data is detected by the movement detecting circuit 406. The movement detecting circuit 406 not only directly receives an image signal but also receives the image data stored in the frame memory 407. The movement detecting circuit 406 obtains a difference data between the two received image data by subtraction processing, removes noise from the difference data, and determines whether the difference data indicates movement.

If the difference data indicates movement, the movement detecting circuit 406 supplies a movement detection signal to the signal line driving circuit 403. When receiving the movement detection signal, the circuit 403 drives the TFTs to write the image data stored in the frame memory 407 into the peripheral pixel electrodes and then the signal line driving circuit 402 drives the TFTs to write the data stored in the frame memory 408 into the central pixel electrodes. Although the image data in the frame memory 407 is one frame ahead of that in the frame memory 408, the image data of the same frame can be written to the peripheral and central pixel electrodes at the same time by writing the image data to the peripheral pixel electrodes one frame earlier than to the central pixel electrodes. Thus, the delay of display in the peripheral portions can be prevented.

By storing image data in the two frame memories 407 and 408, image data written to the central pixel electrodes can be delayed. Thus, there exists no difference in response between the central portion and the peripheral portion in a pixel, thereby allowing correct display of a moving image.

In FIG. 5, digital signal processing is performed. There occurs no problem even if an image signal is an analog signal. In this case, the image signal is input to the frame memories 407 and 408 after converting it into a digital signal by an analog/digital (A/D) converter, and the image signal is input to the signal line driving circuits 402 and 403 after converting it into an analog signal by a digital/analog (D/A) converter.

Embodiment 3

This embodiment is a modified version of the first embodiment, and a central pixel electrode and a peripheral pixel electrode are arranged to overlap with each other. Pixels are formed by interposing a nematic liquid crystal material between a pair of transparent glass substrates.

Figure 6A:
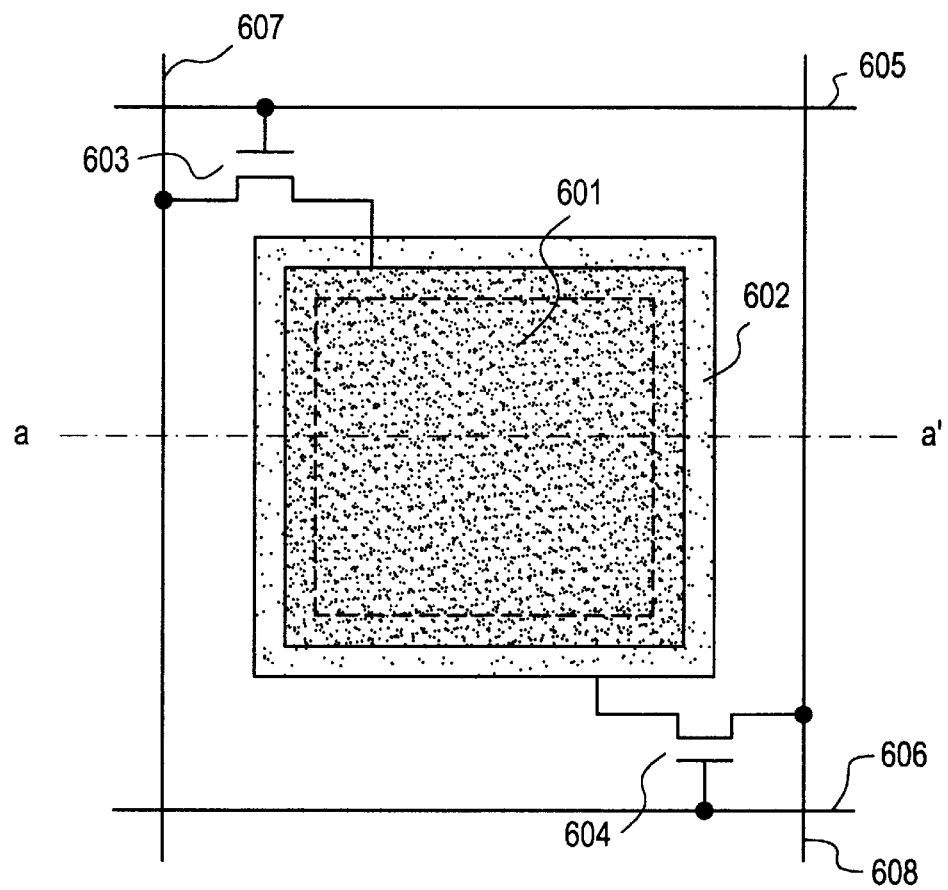
FIGS. 6A and 6B are top and sectional views of a pixel region according to a third embodiment.
Figure 6B:
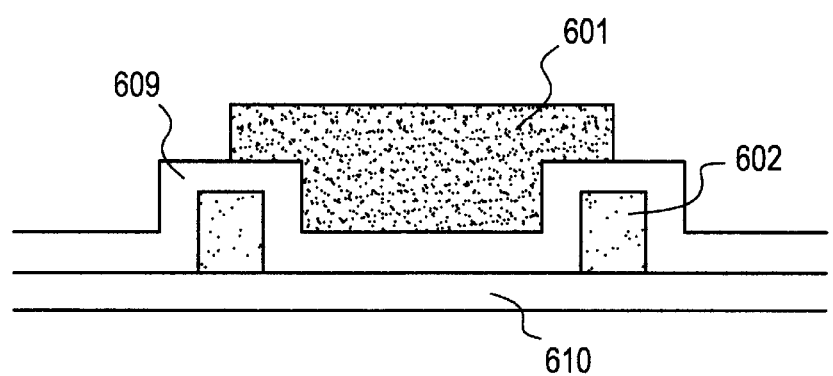
Figure 7A:
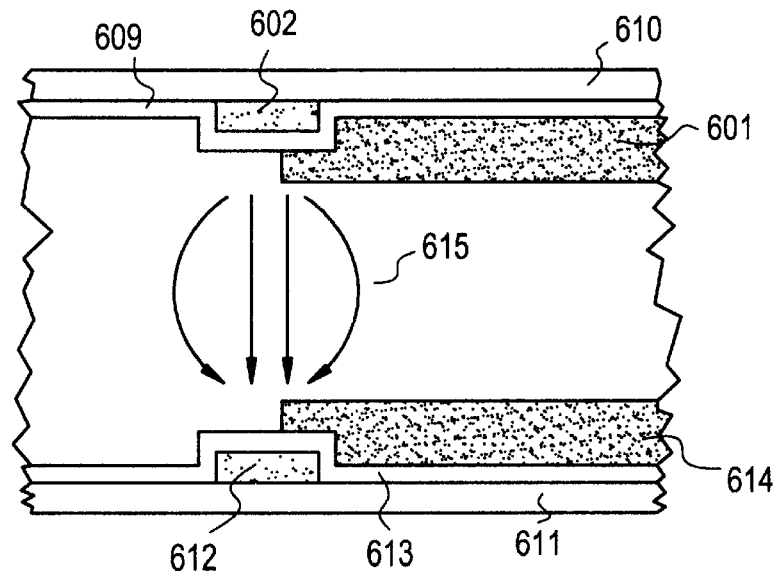
Figure 7B:
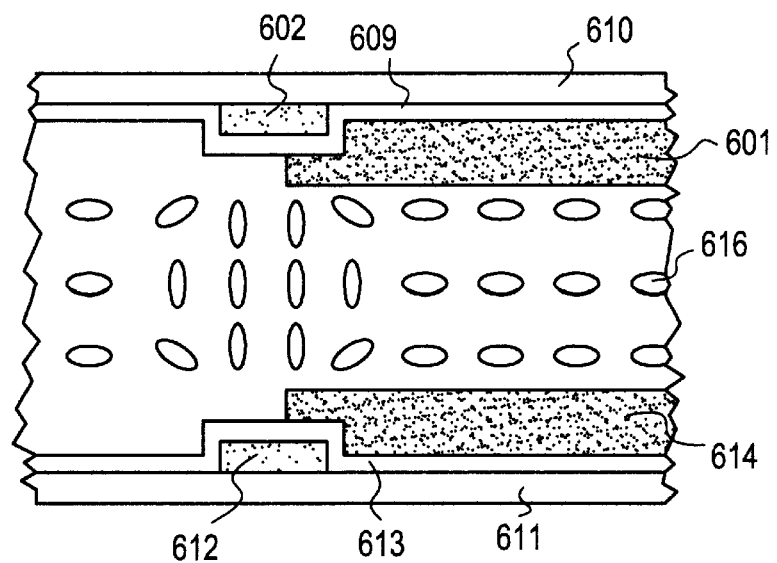

FIG. 6A is a top view of a single pixel region, and FIG. 6B is a sectional view taken along line a–a' in FIG. 6A. FIGS. 7A and 7B are sectional views of the pixel region of the liquid crystal display device, in which FIG. 7A shows electric lines of force and FIG. 7B shows orientations of liquid crystal molecules.

In FIG. 6A, a central pixel electrode 601 is correspond to the conventional pixel. A peripheral pixel electrode 602 is formed adjacent to the perimeter of the electrode 601 to surround it. Pixel TFTs 603 and 604 are connected to the electrodes 601 and 602, respectively. Scanning lines 605 and 606 are connected to the gate electrodes of the TFTs 603 and 604, and signal lines 607 and 608 are connected to the source electrodes of those TFTs. Independent driving circuits (not shown) are connected to the scanning lines 605 and 606 and the signal lines 607 and 608.

In FIG. 6B, the peripheral pixel electrode 602 is formed below the central pixel electrode 601, and an insulating film layer 609 is formed between the layer where the central pixel electrode 601 is formed and the layer where the peripheral pixel electrode 602 is formed.

A method of producing an active matrix panel of the liquid crystal display device is described below. A Corning #7059 glass substrate (thickness: 1.1 mm) or #1713 glass substrate (thickness: 1.1 mm) is used as a transparent substrate 610. TFTs for driving pixel electrodes, peripheral pixel electrodes, and central pixel electrodes are formed on the transparent substrate 610. A necessary number of pixels are formed at a matrix form. A 1,000-Å-thick chromium film is formed on the transparent substrate 610 by sputtering and patterned, to form the peripheral pixel electrodes 602. The electrode 602 also operates as a black matrix. A wiring pattern (not shown) for connecting the electrode 602 and the TFT 604 is formed at the time of forming the electrode 602, or before or after it.

The insulating film 609 is formed on the peripheral pixel electrodes 602 by forming an aluminum oxide film by sputtering and patterning it. The insulating film 609 may be formed with silicon nitride.

A 1,000-Å-thick ITO (indium tin oxide) film is formed on the insulating film 609 by sputtering and patterned, to form the central pixel electrode 601. A wiring pattern for connecting the electrode 601 with the TFT 603 is formed at forming the electrode 601, or before or after it.

It is important in the above steps that the wiring line for connecting the central pixel electrode 601 and the TFT 603 be formed on the insulating film 609 and the wiring line for connecting the peripheral pixel electrode 602 and the TFT 604 be formed under the insulating film 609. Thus, the central pixel electrode 601 and the peripheral pixel electrode 601 can be overlapped with each other and the electrode 602 can be arranged to surround the electrode 601.

A peripheral driving circuit region etc. are formed on the transparent substrate 610 by using TFTs, though details are not described.

A Corning #7059 glass substrate (thickness: 1.1 mm) or #1737 glass substrate (thickness: 1.1 mm) is used as a transparent substrate 611. Opposite electrodes facing the central pixel electrode 601 and the peripheral pixel electrode 602 formed on the transparent substrate 610 are formed on the transparent substrate 611.

A 1,000-Å-thick chromium film is formed on the transparent substrate 611 by sputtering and patterned to form a peripheral pixel electrode 612 opposite to the peripheral pixel electrode 602. The electrode 612 also operates as a black matrix. An aluminum oxide film is formed on the electrode 612 by sputtering and patterned to form an insulating film 613. A 1,000-Å-thick ITO film is formed on the insulating film 613 by sputtering and patterned to form a central pixel electrode 614 as an opposite electrode of the central pixel electrode 601. The electrode 614 mat be formed on the entire surface without patterning.

A pair of transparent substrates constituting the liquid crystal display device is completed by the above process.

Subsequently, orientation films (not shown) for orientation control of a liquid crystal material are formed on the surfaces of the transparent substrates 610 and 611 which are in contact with the liquid crystal material. To obtain the orientation film, a polyimide resin is formed and subjected to a rubbing treatment. In this embodiment, to provide a TN type, the rubbing direction for the transparent substrates 610 and 611 is 90°.

The transparent substrates 610 and 611 are adhered together with an epoxy adhesive to provide an interval. The interval between the transparent substrates 610 and 611 are controlled by spherical spacers having a 5.0-$\mu$m diameter. A liquid crystal material is injected between the transparent substrates 610 and 611 by vacuum injection, for instance.

In displaying a still image, the central pixel electrodes 601 and 614 may be driven in the same manner as in the conventional case. The image is displayed with the electrodes 601 and 614 having the same operation as the conventional pixel electrodes.

In displaying a moving image, the two types of pixel electrodes are driven at different timings to increase the display speed. To this end, a voltage is applied to the liquid crystal by the peripheral pixel electrode, and with a delayed timing, a voltage is applied to the liquid crystal by the central pixel electrode.

FIGS. 7A and 7B show a state that a voltage is applied only between the peripheral pixel electrodes 602 and 612 in the transparent substrate 610 and 611, in which FIG. 7A shows electric lines of force 615 and FIG. 7B shows liquid crystal molecules 616.

Since a voltage is applied between the peripheral pixel electrodes 602 and 612 before a voltage is applied between the central pixel electrodes 601 and 614, part of the liquid crystal molecules 616 located in the peripheral portion of the central pixel (electrode) region change the directions of their molecule major axes from the initial orientation to directions along the electric lines of force 615.

Then, with a desired delay, a voltage is applied by the central pixel electrodes 601 and 614. In this state, the liquid crystal molecules in the peripheral portion of the central pixel region have already responded to the voltage applied between the peripheral pixel electrodes 602 and 612. Thus, since the liquid crystal molecules is responded by the voltage applied by the electrodes 601 and 614 without delaying the response of the liquid crystal molecules in the peripheral portion, the entire liquid crystal molecules in the central pixel region can uniformly respond.

In this embodiment, the peripheral pixel electrodes 602 and 612 are made of chromium to also use as a black matrix. This causes an advantage that even if the peripheral pixel electrodes 602 and 612 and the central pixel electrodes 601 and 614 are driven at different timings, distortion in the orientation of liquid crystal molecules in the peripheral pixel regions can be prevented.

To drive the pixel electrodes in FIGS. 6A and 6B and FIGS. 7A and 7B, the driving circuits of Embodiment 2 can be used.

Figure 8:
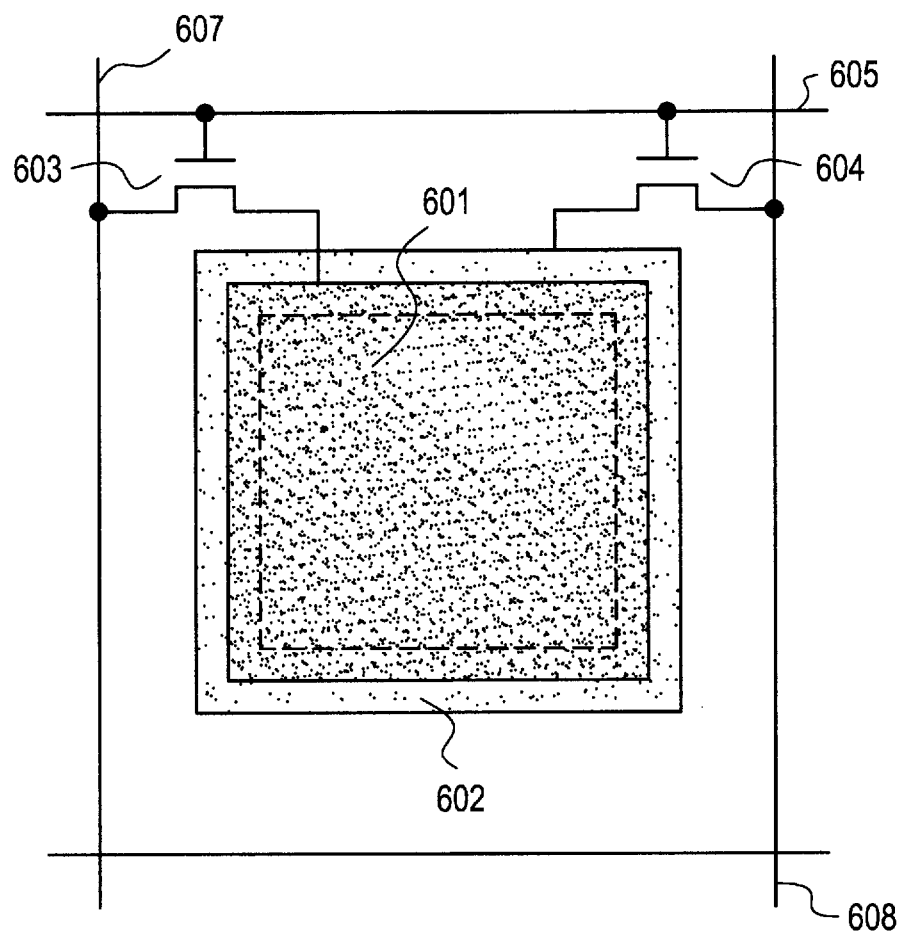
FIG. 8 is a top view of pixel electrodes in a modified version of the third embodiment.

When the central pixel electrodes and the peripheral pixel electrodes can be driven independently, a configuration of FIG. 8 may be used. In FIG. 8, the same numerals as in FIGS. 6A and 6B denote the same components.

A pixel TFT 603 is connected to a central pixel electrode 601, and a pixel TFT 604 is connected to a peripheral pixel electrode 602. The gate electrodes of the TFTs 603 and 604 are connected to the same scanning line 605, and their source electrodes are connected to different signal lines 607 and 608.

Figure 9:
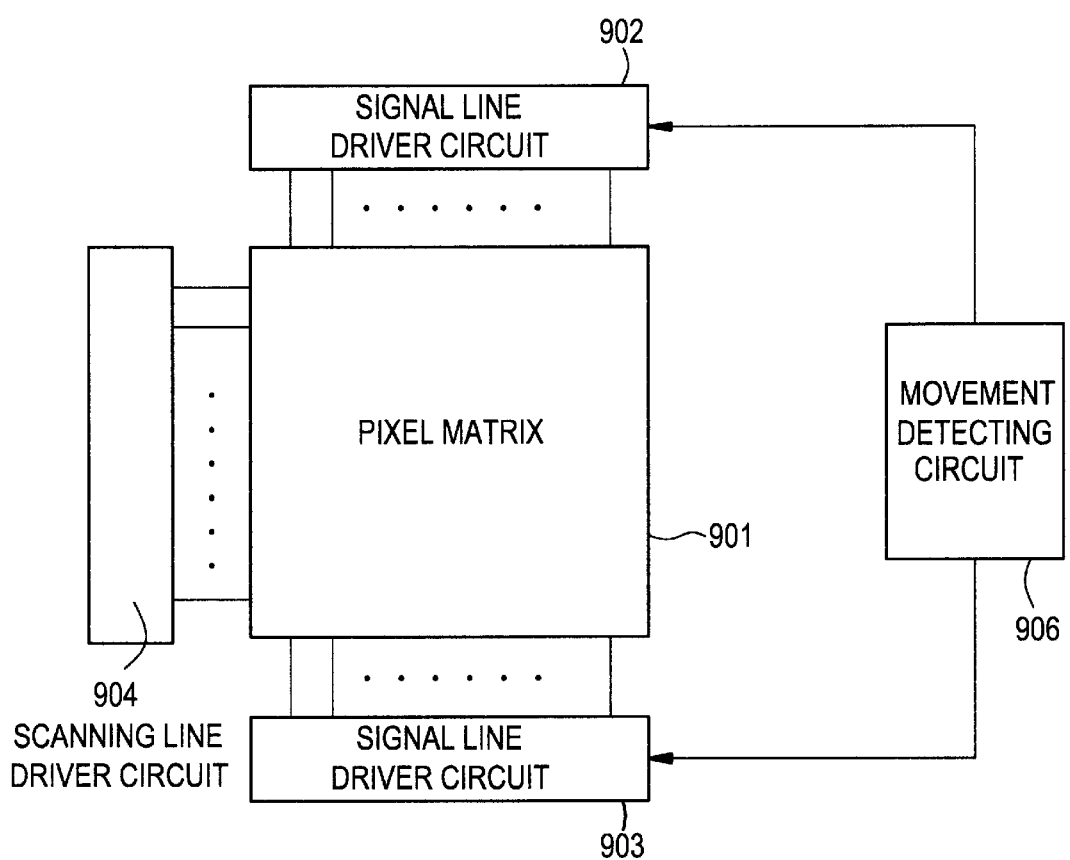
FIG. 9 shows an active matrix liquid crystal display device.
Figure 10:
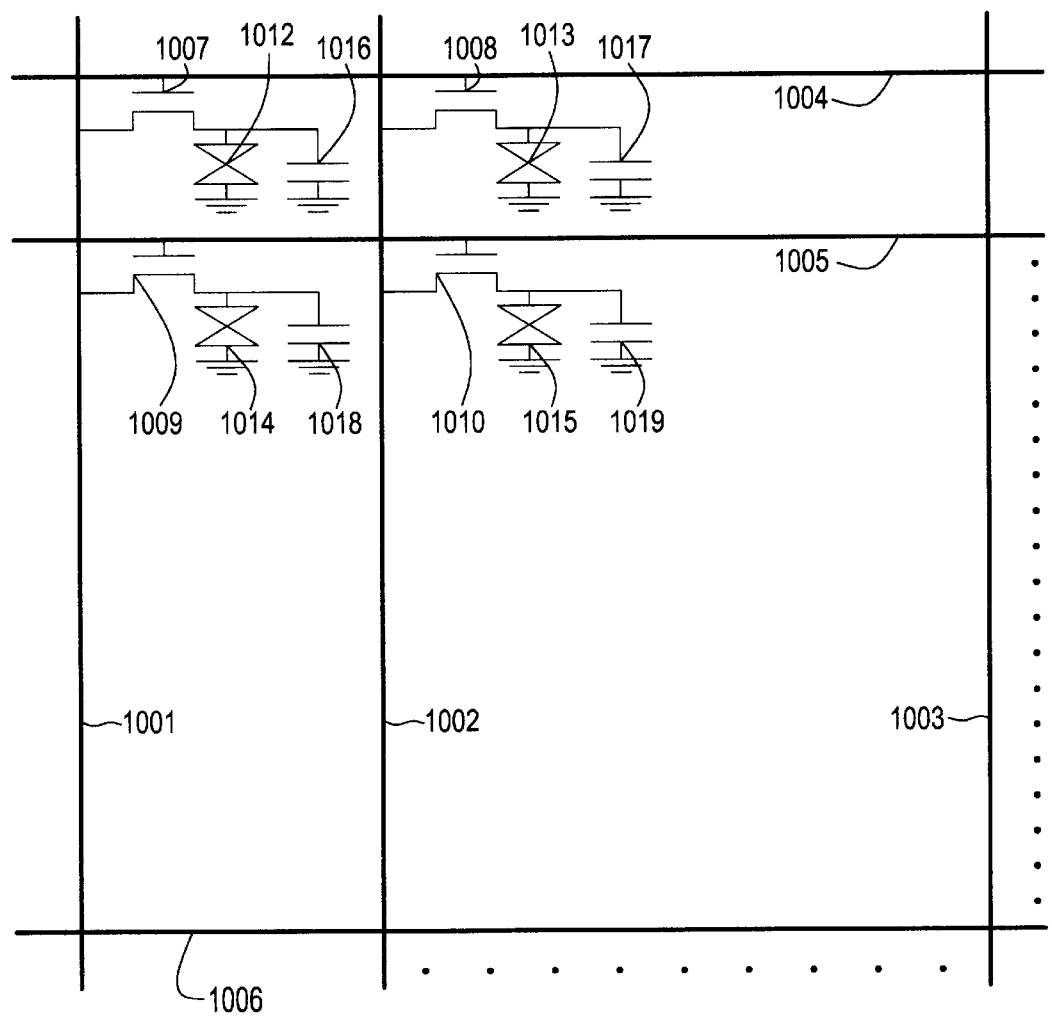
FIG. 10 shows a conventional pixel matrix.
Figure 11:
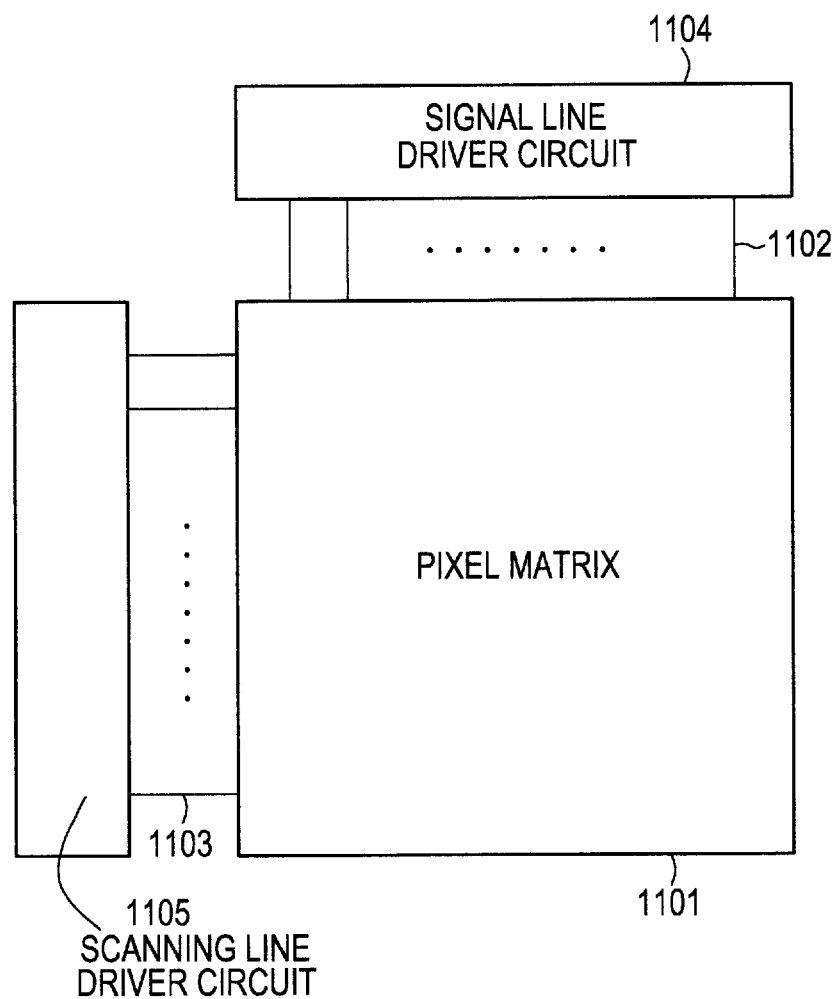
FIG. 11 shows an active matrix having driving circuits.
Figure 12A:
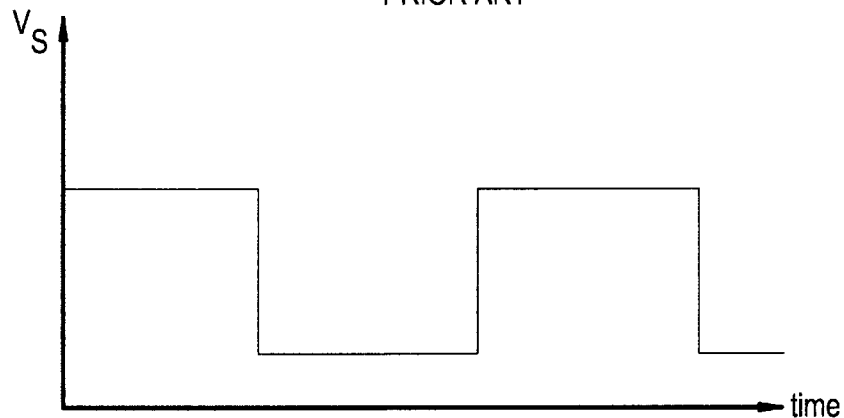
FIGS. 12A–12C show drive waveforms for the conventional active matrix.
Figure 12B:
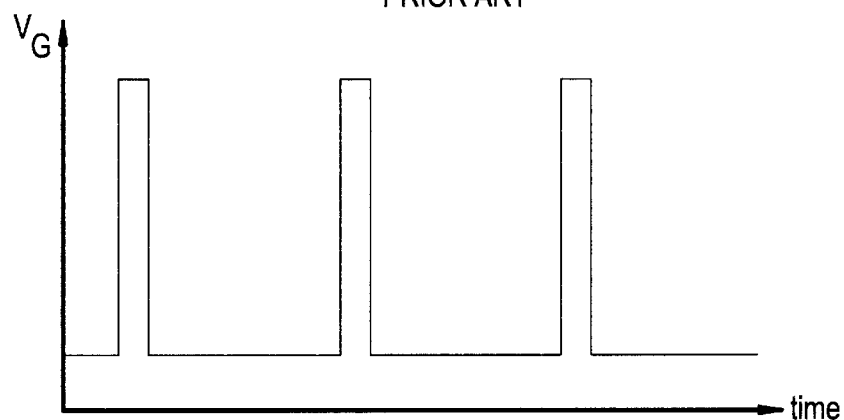
Figure 12C:
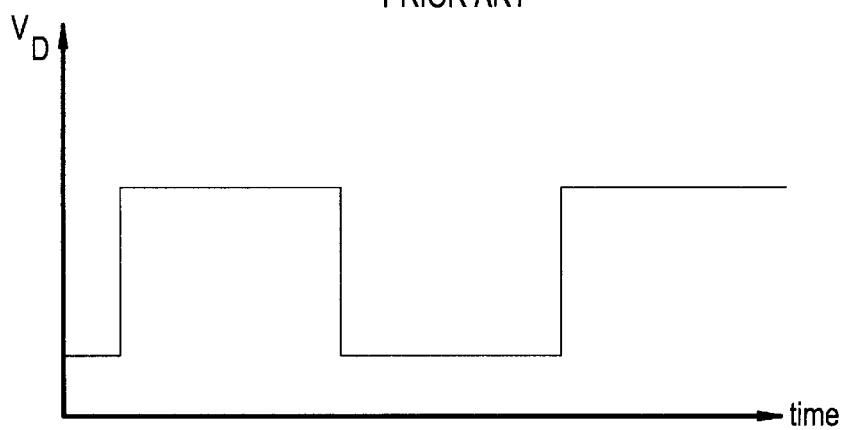
Figure 13:
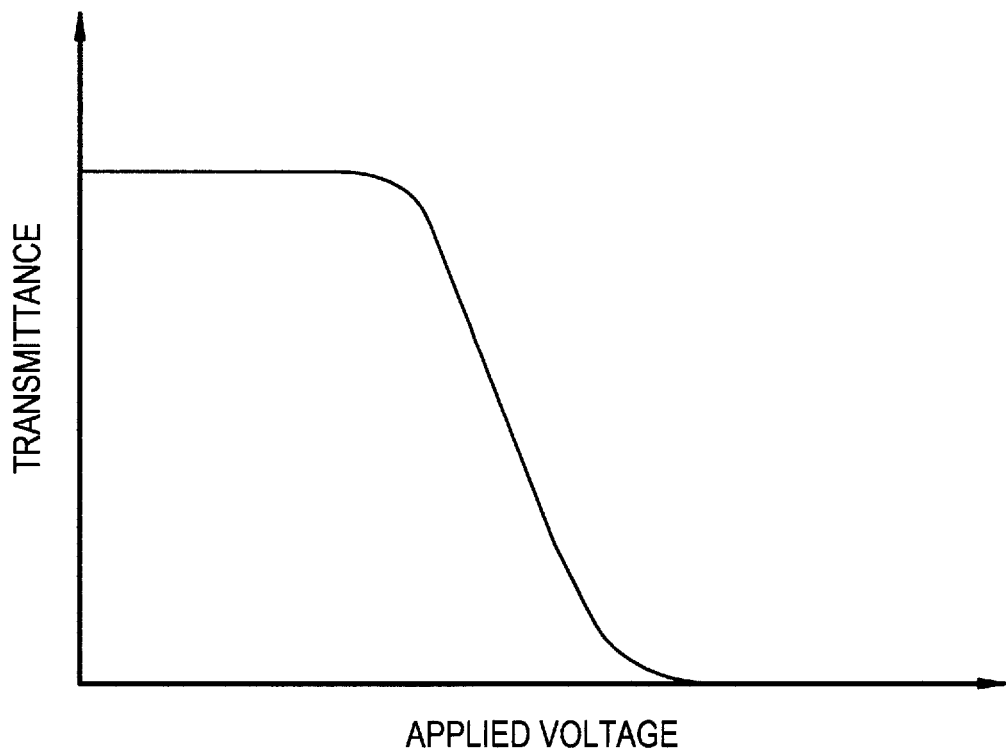
FIG. 13 shows a transmittance-applied voltage characteristic of the TN liquid crystal.
Figure 14A:
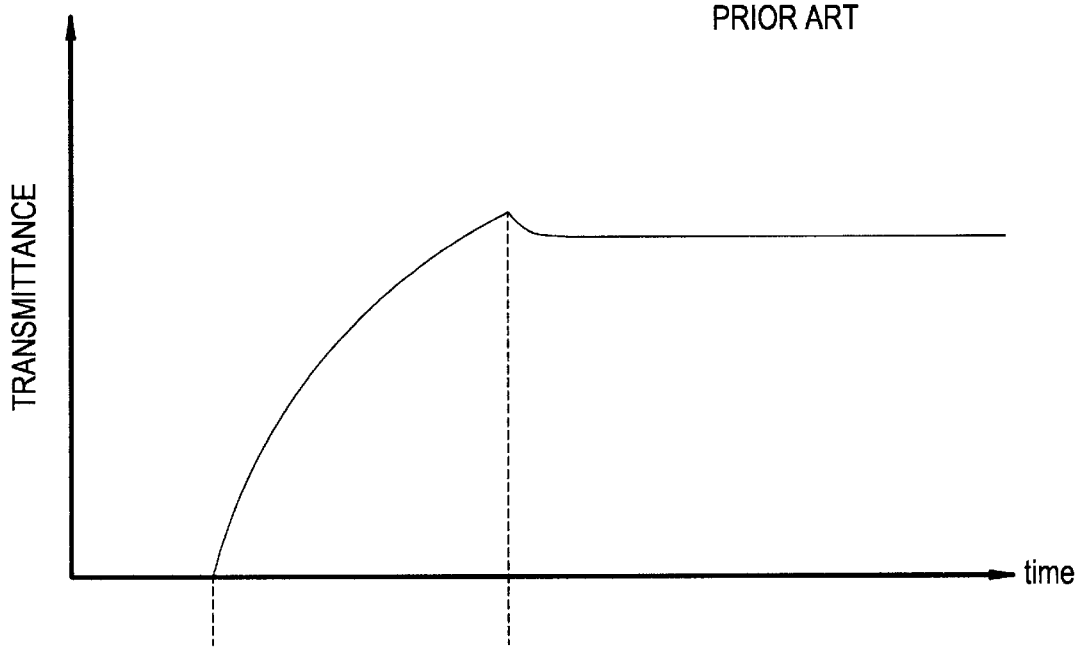
FIGS. 14A and 14B show a response of the TN liquid crystal.
Figure 14B:
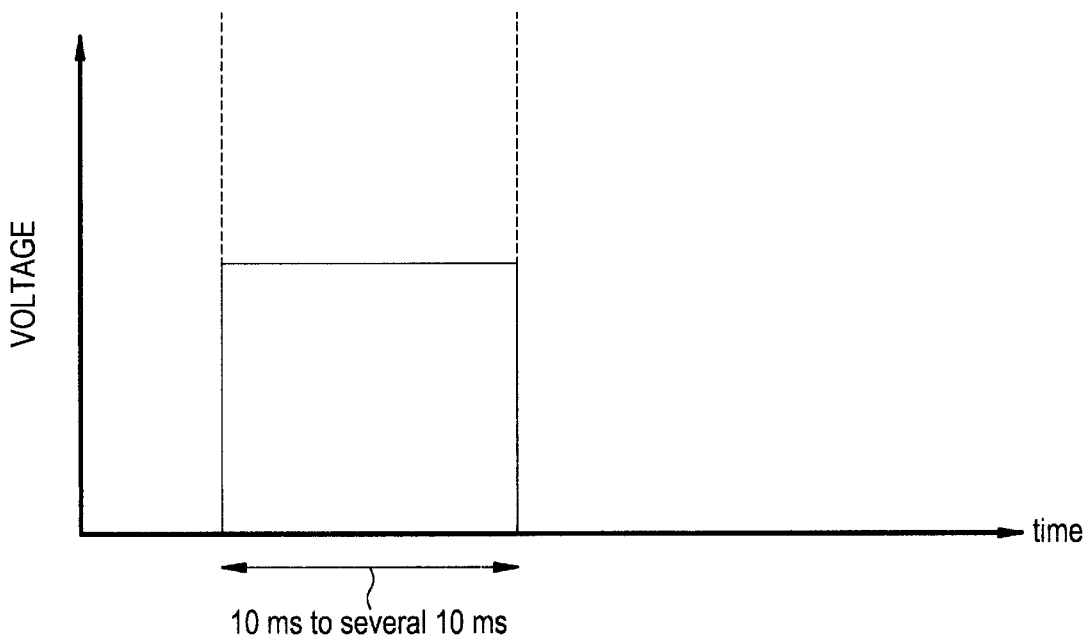
Figure 15A:
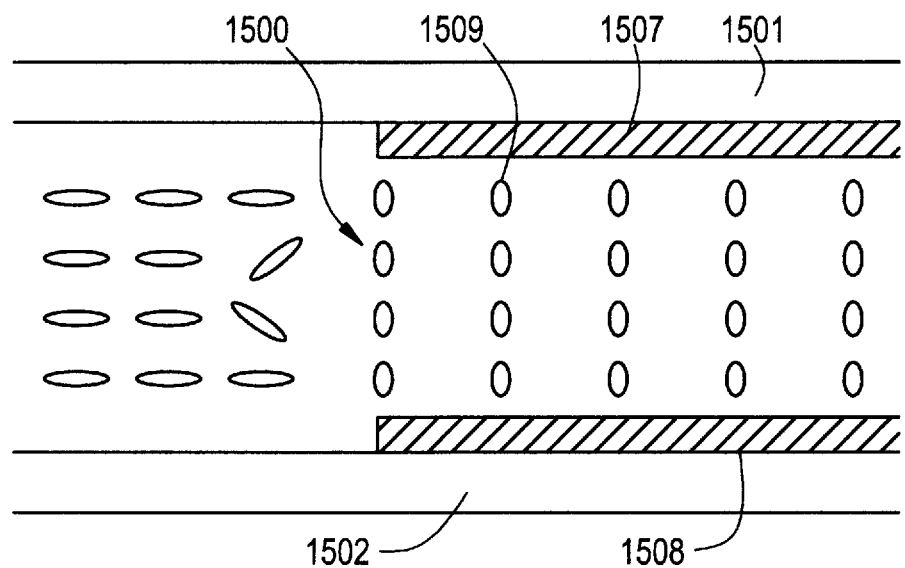
FIGS. 15A and 15B show a response of liquid crystal molecules with conventional pixel electrode.
Figure 15B:
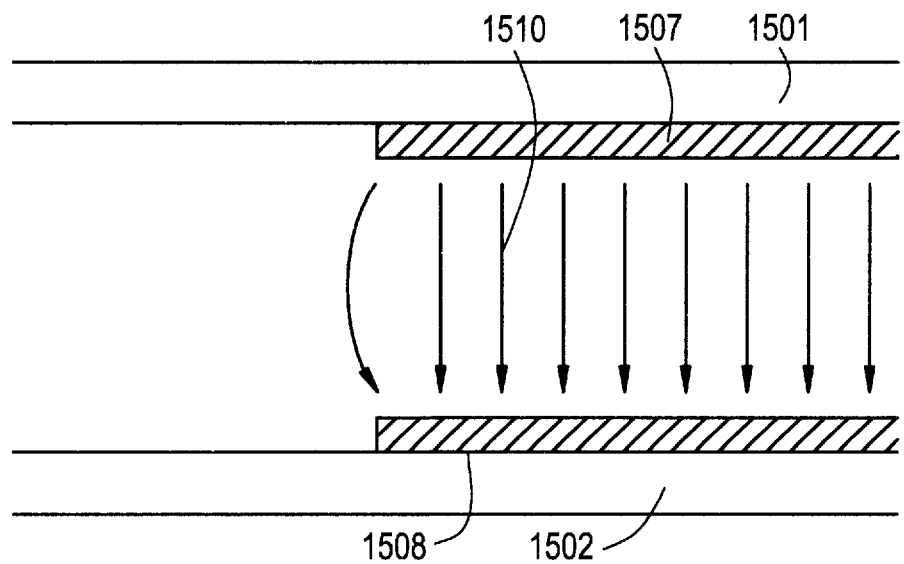

Since the TFTs 603 and 604 are connected to the common signal line 605, it is sufficient that only one scanning line driving circuit be provided to drive the pixels, as in the conventional case. A configuration in FIG. 9 may correspond to the configuration of FIG. 4A.

Two signal line driving circuits 902 and 903 and a scanning line driving circuit 904 are arranged to surround three sides of the pixel matrix 901 and connected thereto. A movement detecting circuit 906 is connected to the circuits 902 and 903.

While the scanning line driving circuit 904 is commonly used, the signal line driving circuits 902 and 903 can supply different video signals to the central pixel electrode 601 and the peripheral pixel electrode 602. Thus, as in the Embodiment 2, it is possible to satisfactorily display both of a still image and a moving image by determining with the movement detecting circuit 906 whether a video image includes a moving component and independently controlling the central pixel electrode 601 and the peripheral pixel electrode 602.

The pixel opening (aperture) ratio can be increased by the configuration of FIG. 8, because the arrangement of the TFTs 603 and 604 can be simplified in comparison with FIG. 6 and the number of scanning lines necessary for the same number of pixels can be halved.

As described above, in the invention, a pixel is divided into the central pixel region and the peripheral pixel region, and the peripheral pixel region is driven earlier than the central pixel region when an image requires fast operation. Thus, the invention has an advantage that the operation speed of the central pixel region can be increased. As a result, the operation speed of the liquid crystal display device can be increased, which in turn enables provision of high quality image display to users.

What is claimed is:

1. An active matrix type liquid crystal display device comprising:
   a pair of transparent substrates;
   signal lines and scan lines which are formed on one of the transparent substrates and intersected in a matrix form;
   a plurality of thin film transistors arranged in intersections of the signal lines and the scan lines;
   transparent pixel electrodes connected to the thin film transistors; and
   a liquid crystal material disposed between the transparent substrates,
   wherein each transparent pixel electrode includes a first pixel electrode arranged in a central portion of one of regions divided by the signal lines and the scan lines and a second pixel electrode surrounding the first pixel electrode, the first and second pixel electrodes are connected to first and second thin film transistors, and the first and second thin film transistors are connected to first and second signal lines and first and second scan lines.

2. The device of claim 1 further comprising driver circuits, and wherein the first and second thin film transistors are driven by first and second driver circuits at different timings through the first and second signal lines and the first and second scan lines.

3. The device of claim 2 wherein the first driver circuit is operated with a first video signal having a delay time corresponding at least one frame period longer than a delay time of a second video signal used to operate the second driver circuit, and the delay time of the first video signal is n-times one frame period (n is integer).

4. The device of claim 3 wherein the second driver circuit is operated with the second video signal when a video signal includes a moving component.

5. A method for driving a display device including a pair of transparent substrates, signal lines and scan lines which are formed on one of the transparent substrates and intersected in a matrix form, a plurality of thin film transistors arranged in intersections of the signal lines and the scan lines, transparent pixel electrodes connected to the thin film transistors, and a liquid crystal material disposed between the transparent substrates, wherein each transparent pixel electrode includes a first pixel electrode arranged in a central portion of one of regions divided by the signal lines and the scan lines and a second pixel electrode surrounding the first pixel electrode, the first and second pixel electrodes are connected to first and second thin film transistors, and the first and second thin film transistors are connected to first and second signal lines and first and second scan lines, the method comprising the steps of:

comparing a video signal to be input with an original video signal;

determining whether a moving component is detected or not in accordance with a comparison result;

driving the first thin film transistor with a previous video signal received before input of the video signal when the moving component is detected; and driving the second thin film transistor with the input video signal when the moving component is detected, wherein a period between the input video signal and the previous video signal is one frame period or more.

6. A display device comprising:

a pair of transparent substrates;

signal lines and scan lines which are formed on one of the transparent substrates and intersected in a matrix form;

a plurality of thin film transistors arranged in intersections of the signal lines and the scan lines;

transparent pixel electrode regions connected to the thin film transistors; and a liquid crystal material disposed between the transparent substrates, wherein each transparent pixel electrode region applies an electric field to the liquid crystal material and includes a first electrode arranged in a central portion of the transparent pixel electrode region and a second electrode arranged in a peripheral portion of the transparent pixel electrode region, and wherein a portion of the first electrode and a portion of the second electrode overlap each other, and wherein the first and second electrodes are connected to first and second thin film transistors, and the first and second thin film transistors are connected to first and second signal lines and first and second scan lines.

7. A display device comprising:

a pair of transparent substrates;

signal lines and scan lines which are formed on one of the transparent substrates and intersected in a matrix form;

a plurality of thin film transistors arranged in intersections of the signal lines and the scan lines;

transparent pixel electrode regions connected to the thin film transistors; and a liquid crystal material disposed between the transparent substrates, wherein each transparent pixel electrode region applies an electric field to the liquid crystal material and includes a first electrode arranged in a central portion of the transparent pixel electrode region and a second electrode arranged to surround the first electrode, and wherein a portion of the first electrode and a portion of the second electrode overlap each other, and wherein the first and second electrodes are connected to first and second thin film transistors, and the first and second thin film transistors are connected to first and second signal lines and first and second scan lines.

8. An active matrix type liquid crystal display device comprising:

a pair of transparent substrates;

signal lines and scan lines which are formed on one of the transparent substrates and intersected in a matrix form;

a plurality of thin film transistors arranged in intersections of the signal lines and the scan lines;

transparent pixel electrodes connected to the thin film transistors; and a liquid crystal material disposed between the transparent substrates, wherein each transparent pixel electrode includes a first pixel electrode arranged in a central portion of one of regions divided by the signal lines and the scan lines and a second pixel electrode surrounding the first pixel electrode, the first and second pixel electrodes are connected to first and second thin film transistors, the first and second thin film transistors are connected to first and second signal lines and first and second scan lines, and the first and second pixel electrodes are formed on different surfaces.

9. The device of claim 8 further comprising driver circuits, and wherein the first and second thin film transistors are driven by first and second driver circuits at different timings through the first and second signal lines and the first and second scan lines.

10. The device of claim 9 wherein the first driver circuit is operated with a first video signal having a delay time corresponding at least one frame period longer than a delay time of a second video signal used to operate the second driver circuit, and the delay time of the first video signal is n-times one frame period (n is integer).

11. The device of claim 10 wherein the second driver circuit is operated with the second video signal when a video signal includes a moving component.

12. A liquid crystal display device comprising:

a plurality of pixel regions; and driver circuits for driving the pixel regions, wherein each pixel region comprises, a first pixel electrode arranged in a central portion of the pixel region, and a second pixel electrode arranged to surround at least a portion of the first pixel electrode, wherein a portion of the first pixel electrode and a portion of the second pixel electrode overlap each other, and wherein the first and second pixel electrodes are connected to first and second thin film transistors, and the first and second thin film transistors are connected to first and second signal lines and first and second scan lines.

13. The device of claim 12 wherein the first and second pixel electrodes are formed on different surfaces.

14. The device of claim 13 wherein the first pixel electrode overlaps the second pixel electrode.

15. A display device comprising:

two scanning lines;

two signal lines;

a pixel having a central pixel electrode and a peripheral pixel electrode which surrounds said central pixel electrode;

a first transistor connected with said peripheral pixel electrode at one of source and drain thereof, and connected with one of said two signal lines at the other of said source and said drain, and connected with one of said two scanning lines at a gate electrode thereof; and a second transistor connected with said central pixel electrode at one of source and drain of said second transistor, and connected with the other of said two signal lines at the other of said source and drain of said second transistor, and connected with the other of said two scanning lines at a gate electrode of said second transistor.

16. The device of claim 15 wherein said peripheral pixel electrode surrounds at least two sides of said central pixel electrode.

17. A method for driving a display device having a pixel comprising a central pixel electrode and a peripheral pixel electrode which surrounds said central pixel electrode, said method comprising:

applying a first electric field to said peripheral pixel electrode through a first transistor connected with said peripheral pixel electrode at one of source and drain thereof, and connected with one of two signal lines at the other of said source and drain, and connected with one of two scanning lines at a gate electrode thereof;

applying a second electric field to said central pixel electrode through a second transistor connected with said central pixel electrode at one of source and drain of said second transistor, and connected with the other of said two signal lines at the other of said source and drain of said second transistor, and connected with the other of said two scanning lines at a gate electrode of said second transistor.

18. The method of claim 17 wherein said peripheral pixel electrode surrounds at least two sides of said central pixel electrode.

19. The method of claim 17 wherein said second electric field is applied to said central pixel electrode through said second transistor after said first electric field is applied to said peripheral pixel electrode through said first transistor.

* * * * *